2,844,509

PREVENTION AND SUPPRESSION OF COCCIDIOSIS IN POULTRY WITH 2,2'-THIOBIS(2,4-DICHLOROPHENOL)

Frederick Coulston, Rensselaer, and Emery W. Dennis, Albany, N. Y., assignors to Sterling Drug Inc., New York, N. Y., a corporation of Delaware No Drawing. Application July 20, 1956
Serial No. 599,034

6 Claims. (Cl. 167—53.1)

This invention relates to chemotherapeutic compositions and methods for the prevention and suppression of coccidiosis in poultry.

Coccidiosis in fowl is a highly destructive disease caused by protozoan organisms known as coccidia which are of the genus Eimeria. The coccidia gain access to the host through the ingestion of oöcysts which are found in fecal droppings of fowl harboring the parasites and which may contaminate feed, water, and soil. The coccidia may multiply rapidly, eroding the epithelial tissue of the digestive tract of the fowl and causing hemorrhage, weakness, emaciation, and digestive disturbances. Birds which are able to survive severe infections are left in a condition of debilitation which substantially reduces their market value.

Many remedies for the suppression of coccidiosis have been proposed, but some of these have little or no effectiveness, while others are too toxic or too expensive. Moreover, with the previously available remedies there may be encountered such metabolic difficulties as poisoning of the hematopoietic system and a subsequent reducing of the number of red and white blood cells, adverse effect on fertility, color, taste, or odor of eggs produced by the birds, and unpalatability of the flesh of the birds. The need for new and improved means for ecenomically and safely repressing coccidial infection in poultry has therefore remained a serious problem in the poultry industry.

In accordance with the present invention, we have discovered that clinical coccidiosis or appearance of coccidiosis in poultry can be prevented and suppressed by orally administering to the birds a small amount of 2,2'-thiobis(2,4-dichlorophenol), also designated as bithionol, having the structural formula

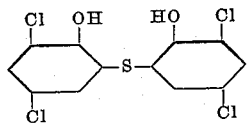

This substance, a known and readily available compound, can be conveniently administered in admixture with the feed or water of the fowl to afford either continuous or intermittent treatment in doses sufficient to suppress the development of coccidial infection without adversely affecting the metabolism of the fowl or undesirably altering either the taste of the flesh of the fowl when prepared for eating or the color, odor, taste, or fertility of the eggs produced by the birds.

For greatest effectiveness, the bithionol is used prophylactically; that is, it is best administered prior to and concurrently with exposure of the poultry to infection or within a short time following each exposure. Practically speaking, the treatment can be most readily carried out by daily administration of bithionol to the poultry flock at a dosage level affording continuous protection against coccidial infection of clinical importance.

Although the optimum daily dosage of bithionol for a given bird would of course vary in accordance with such factors as the age and weight of the bird, intensity of exposure to infection, and the like, we have found that satisfactory results are obtained in the management of coccidiosis when each bird receives bithionol daily at a level of about 0.05 to 1.0 percent by weight of the daily diet of the bird or about 40 to 800 milligrams of bithionol per kilogram of body weight. When administered with feeds, the percentage of the bithionol can be varied considerably, and it is only necessary to adjust the concentration so that an effective dose of bithionol is ingested by the bird in consuming its daily ration of food. Thus, for example, we have found that good results are obtained when each bird is fed daily a commercial poultry feed containing about 0.05–1.0 percent by weight of bithionol.

Feed compositions containing the bithionol in any desired amount can be readily prepared by dispersing the compound in the feed used as the sole or part ration of the fowl, as by mechanically mixing the bithionol in finely ground form with the feed or dispersing a solution of the bithionol in the food and either removing the solvent or, if the solvent is edible, allowing it to remain in the feed. The feed composition can be prepared either for direct use by mixing 0.05–1.0 percent of bithionol by weight with the feed; or, if desired, a concentrated medicated pre-mix feed can be obtained by using a considerably larger preparation of bithionol, for instance 20 to 60 percent by weight, which is suitable for subsequent blending with a larger amount of the same or a different kind of poultry feed to arrive at the desired concentration of bithionol for feeding.

In preparing the medicated feeds of our invention, there can be used any suitable poultry feed, such as a commercial mash of the starting, growing, or laying type, which of course will satisfactorily supply the normal nutritional requirements of the birds. These feeds commonly contain ground grains and various other added ingredients such as minerals, vitamins, powdered milk, meat or protein substitute, and the like.

Our invention is illustrated by the following example without, however, being limited thereto.

Example 1

5 g. of 2,2'-thiobis(2,4-dichlorophenol) was dispersed uniformly in 5 kg. of a commercial poultry starting mash, thereby producing a medicated feed containing about 0.1 percent by weight of 2,2'-thiobis(2,4-dichlorophenol). In similar fashion, medicated feeds containing respectively about 0.05 and 0.25 percent by weight of 2,2'-thiobis(2,4-dichlorophenol) were prepared. These compositions and the unmodified poultry mash were fed as the sole ration to seven groups of six White Rock Cross chickens four weeks of age. Forty-eight hours after this diet was started, approximately 50,000 oöcysts of *Eimeria tenella* were introduced directly into the crop of each bird. Seven days after this inoculation, the chickens were sacrificed and autopsied. Examination of the cecum of each bird was carried out to determine the extent of cecal necrosis, which was recorded as indicated below in terms of the severity of the pathologic condition. Also, a sample of cecal content was removed and examined microscopically for the presence or absence of oöcysts. A comparison of the degrees of infection of treated and untreated birds showed the follow results:

| Percent of Bithionol in the Feed | No. of Chickens per group | Cecal Gross Pathology Score | | | | |
|---|---|---|---|---|---|---|
| | | None | Slight | Moderate | Severe | Very Severe |
| None (Control) | 6 | | | | 4 | 2 |
| | 6 | | | 1 | 2 | 3 |
| 0.05 | 6 | 2 | 2 | 2 | | |
| | 6 | 5 | | 1 | | |
| 0.1 | 6 | 5 | | 1 | | |
| | 6 | 4 | 2 | | | |
| 0.25 | 6 | 5 | | 1 | | |

The above results showed the high efficacy of the bithionol-containing feeds in preventing and suppressing development of coccidiosis in the test birds. Moreover, the treated birds in every instance showed no adverse metabolic or pharmacologic effects. Additional similar studies showed that feeding chickens the medicated feeds of the above type did not affect adversely the palatability of the flesh of the birds and did not undesirably alter the color, odor, taste, or fertility of eggs produced by the treated birds.

We claim:

1. A composition for the prevention and suppression of coccidiosis in poultry which comprises a poultry feed and dispersed therein as an effective anticoccidial ingredient 2,2'-thiobis(2,4-dichlorophenol).

2. A composition for the prevention and suppression of coccidiosis in poultry which comprises a poultry feed and dispersed therein as an effective anticoccidial ingredient 2,2'-thiobis(2,4-dichlorophenol) in the amount of from 0.05 to 1.0 percent by weight of the composition.

3. A composition for the prevention and suppression of coccidiosis in poultry which comprises a poultry feed and dispersed therein as an effective anticoccidial ingredient 2,2'-thiobis(2,4-dichlorophenol) in the amount of about 0.1 percent by weight of the composition.

4. The process for preventing and suppressing coccidiosis in poultry which comprises orally administering to the poultry an effective anticoccidial amount of 2,2'-thiobis(2,4-dichlorophenol).

5. The process for preventing and suppressing coccidiosis in poultry which comprises feeding the poultry a composition comprising poultry feed having dispersed therein as an anticoccidial ingredient 0.05 to 1 percent by weight of 2,2'-thiobis(2,4-dichlorophenol).

6. The process for preventing and suppressing coccidiosis in poultry which comprises feeding the poultry a composition comprising poultry feed having dispersed therein as an anticoccidial ingredient about 0.1 percent by weight of 2,2'-thiobis(2,4-dichlorophenol).

References Cited in the file of this patent

FOREIGN PATENTS 525,416   Canada _____ May 22, 1956

OTHER REFERENCES

Thompson: Ind. and Eng. Chem., vol. 42, May 1950, pp. 922–924.